(12) United States Patent  
Chavdar (10) Patent No.: US 8,563,448 B2
(45) Date of Patent: Oct. 22, 2013

(54) FRICTION MEMBER AND FRICTION MATERIAL THEREOF

(75) Inventor: Bulent Chavdar, Rochester Hills, MI (US)

(73) Assignee: Eaton Corporation, Cleveland, OH (US)

(*) Notice: Subject to any disclaimer, the term of this patent is extended or adjusted under 35 U.S.C. 154(b) by 179 days.

(21) Appl. No.: 12/966,322

(22) Filed: Dec. 13, 2010

(65) Prior Publication Data

US 2011/0189460 A1    Aug. 4, 2011

Related U.S. Application Data

(60) Provisional application No. 61/299,659, filed on Jan. 29, 2010, provisional application No. 61/299,693, filed on Jan. 29, 2010.

(51) Int. Cl.
*B32B 3/00* (2006.01)
*B32B 5/02* (2006.01)
*F16D 65/00* (2006.01)

(52) U.S. Cl.
USPC .......... 442/179; 442/59; 442/172; 188/251 A; 192/107 M (58) Field of Classification Search
USPC ................ 442/179, 59, 172; 188/251 A; 192/107 M
See application file for complete search history.

(56) References Cited

U.S. PATENT DOCUMENTS

| | | | |
|---|---|---|---|
| 2,280,240 A | 4/1942 | Kathe | |
| 2,381,911 A | 8/1945 | Kathe | |
| 3,141,814 A * | 7/1964 | Schultz | 162/155 |
| 4,173,681 A | 11/1979 | Durrieu et al. | |
| 4,256,801 A | 3/1981 | Chuluda | |
| 5,083,650 A | 1/1992 | Seiz et al. | |
| 5,230,952 A | 7/1993 | McCord | |
| 5,478,642 A | 12/1995 | McCord | |
| 5,585,166 A | 12/1996 | Kearsey | |
| 5,629,101 A | 5/1997 | Watremez | |
| 5,670,231 A | 9/1997 | Ohya et al. | |
| 5,707,905 A | 1/1998 | Lam et al. | |
| 5,753,356 A | 5/1998 | Lam et al. | |
| 5,775,468 A | 7/1998 | Lam et al. | |
| 5,856,244 A | 1/1999 | Lam et al. | |

(Continued)

FOREIGN PATENT DOCUMENTS

| | | |
|---|---|---|
| EP | 0246337 A1 | 11/1987 |
| EP | 0292997 B1 | 11/1988 |

(Continued)

*Primary Examiner* — Matthew Matzek
(74) *Attorney, Agent, or Firm* — Quinn Law Group, PLLC (57) ABSTRACT

A friction material includes a resin and a fibrous base material impregnated with the resin. The fibrous base material has a single ply, and includes a plurality of aramid fibers present in a first amount, a plurality of polyacrylonitrile-based carbon fibers present in a second amount that is less than the first amount, a plurality of carbon particles present in a third amount that is less than or equal to the second amount, a plurality of mineral fibers present in a fourth amount that is less than or equal to the second amount, and diatomaceous earth present in a fifth amount that is greater than the first amount. A friction member for operatively contacting a lubricated surface includes a substrate and the friction material. The friction material defines a first surface bonded to the substrate and a second surface configured for operatively contacting the lubricated surface.

20 Claims, 1 Drawing Sheet

(56) References Cited

U.S. PATENT DOCUMENTS

| | | | |
|---|---|---|---|
| 5,879,791 A * | 3/1999 | Kato et al. | 428/295.1 |
| 5,958,507 A | 9/1999 | Lam et al. | |
| 5,965,658 A | 10/1999 | Smith et al. | |
| 5,989,390 A | 11/1999 | Lee | |
| 5,998,307 A | 12/1999 | Lam et al. | |
| 6,001,750 A | 12/1999 | Lam | |
| 6,013,696 A | 1/2000 | Hill et al. | |
| 6,121,168 A | 9/2000 | Irifune et al. | |
| 6,130,176 A * | 10/2000 | Lam | 442/101 |
| 6,194,059 B1 | 2/2001 | Yesnik | |
| 6,365,222 B1 | 4/2002 | Wagner et al. | |
| 6,458,466 B1 | 10/2002 | Jones et al. | |
| 6,630,416 B1 | 10/2003 | Lam et al. | |
| 6,667,103 B1 | 12/2003 | Mori et al. | |
| 6,667,104 B2 | 12/2003 | Aiba et al. | |
| 6,875,711 B2 | 4/2005 | Chen et al. | |
| 7,008,498 B2 | 3/2006 | Lamport | |
| 7,070,835 B2 | 7/2006 | Burns | |
| 7,175,921 B2 | 2/2007 | Hatono et al. | |
| 7,249,663 B2 | 7/2007 | Mordukhovich et al. | |
| 7,294,188 B2 | 11/2007 | Shao et al. | |
| 7,294,388 B2 | 11/2007 | Lam et al. | |
| 7,318,967 B2 | 1/2008 | Hatono et al. | |
| 7,338,724 B2 | 3/2008 | Hatono et al. | |
| 7,354,638 B2 | 4/2008 | Bowles et al. | |
| 7,390,561 B2 | 6/2008 | Grinberg et al. | |
| 7,393,559 B2 | 7/2008 | Groza et al. | |
| 7,488,401 B2 | 2/2009 | Lee et al. | |
| 2004/0043243 A1 | 3/2004 | Chen et al. | |
| 2004/0164438 A1 | 8/2004 | Lamport | |
| 2005/0034830 A1 | 2/2005 | Kimura et al. | |
| 2005/0064778 A1 | 3/2005 | Lam et al. | |
| 2005/0067251 A1 | 3/2005 | Bradford, Jr. et al. | |
| 2005/0072255 A1 | 4/2005 | McCrary et al. | |
| 2005/0074595 A1 | 4/2005 | Lam | |
| 2005/0075019 A1 | 4/2005 | Lam et al. | |
| 2005/0153821 A1 | 7/2005 | Grinberg | |
| 2006/0009541 A1 * | 1/2006 | Chen et al. | 523/149 |
| 2006/0027792 A1 | 2/2006 | Butcher et al. | |
| 2007/0267604 A1 | 11/2007 | Butcher et al. | |
| 2007/0287768 A1 | 12/2007 | Miyaji et al. | |
| 2008/0226861 A1 | 9/2008 | Foge | |
| 2009/0048369 A1 | 2/2009 | Newcomb et al. | |

FOREIGN PATENT DOCUMENTS

| | | |
|---|---|---|
| EP | 1039168 A1 | 9/2000 |
| EP | 1203897 A1 | 5/2002 |
| EP | 1750031 A2 | 2/2007 |
| WO | 9809093 A1 | 3/1998 |
| WO | 0040797 A1 | 7/2000 |
| WO | 2009055371 A2 | 4/2009 |

* cited by examiner

FRICTION MEMBER AND FRICTION MATERIAL THEREOF

CROSS-REFERENCE TO RELATED APPLICATIONS

This application claims the benefit of U.S. Provisional Patent Application No. 61/299,659, filed Jan. 29, 2010, and U.S. Provisional Patent Application No. 61/299,693, filed Jan. 29, 2010, which are hereby incorporated by reference in their entirety.

TECHNICAL FIELD

The present disclosure generally relates to a friction member and a friction material thereof.

BACKGROUND

Friction materials are often useful for applications where opposing surfaces engage to transmit mechanical and/or thermal energy. For example, friction materials may be disposed between opposing surfaces in brake, clutch, and torque conversion applications. Such applications often require friction materials having excellent friction stability and wear-, noise-, pressure-, and temperature-resistance.

One type of friction material, a partially-wet friction material, may be specifically useful for applications requiring reduced lubrication during mechanical and/or thermal energy transmission. For example, partially-wet friction materials are often at least partially submerged in, and impregnated with, a liquid such as brake fluid, automatic transmission fluid, and/or oil during operation.

SUMMARY

A friction material includes a resin and a fibrous base material impregnated with the resin. The fibrous base material has a single ply, and includes a plurality of aramid fibers present in a first amount. The fibrous base material also includes a plurality of polyacrylonitrile-based carbon fibers present in a second amount that is less than the first amount, a plurality of carbon particles present in a third amount that is less than or equal to the second amount, and a plurality of mineral fibers present in a fourth amount that is less than or equal to the second amount. Further, the fibrous base material includes diatomaceous earth present in a fifth amount that is greater than the first amount.

In one variation, the plurality of aramid fibers includes a first component including a plurality of fibrillated aramid fibers and a second component including a plurality of non-fibrillated aramid fibers. In addition, the plurality of polyacrylonitrile-based carbon fibers includes a third component having a third average length, and a fourth component having a fourth average length that is longer than the third average length.

A friction member for operatively contacting a lubricated surface includes a substrate and the friction material. The friction material defines a first surface bonded to the substrate and a second surface configured for operatively contacting the lubricated surface.

The above features and advantages and other features and advantages of the present disclosure are readily apparent from the following detailed description of the best modes for carrying out the disclosure when taken in connection with the accompanying drawings.

DETAILED DESCRIPTION

Figures 1, 2:
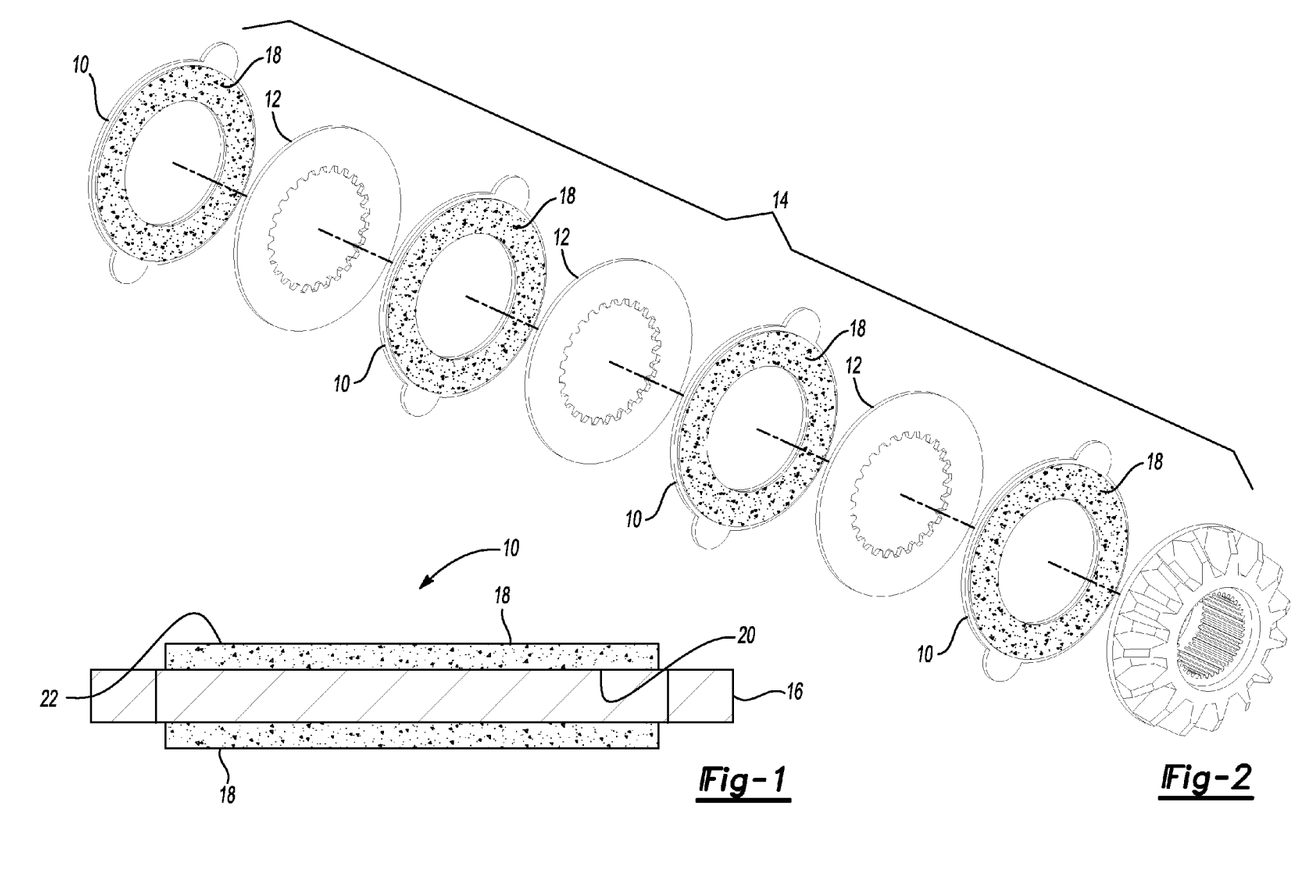
FIG. 1 is a schematic cross-sectional illustration of a friction member including a friction material disposed on a substrate.
FIG. 2 is a schematic perspective exploded illustration of the friction member of FIG. 1 disposed between lubricated surfaces.

Referring to the Figures, wherein like reference numerals refer to like elements, a friction member for operatively contacting a lubricated surface 12 (FIG. 2) is shown generally at 10 in FIG. 1. The friction member 10 may be useful for applications requiring excellent friction stability, wear-resistance, noise-resistance, pressure-resistance, and temperature-resistance, as set forth in more detail below. Therefore, the friction member 10 may be useful for automotive applications including, but not limited to, clutch plates, transmission bands, brake shoes, synchronizer rings, friction discs, system plates, and limited slip differential components. However, the friction member 10 may also be useful for non-automotive applications including, but not limited to, railway brake blocks and clutch facings, multi-disc aircraft brakes, crane and elevator components, and other transportation and industrial applications.

Referring now to FIG. 2, in operation, the friction member 10 may operatively contact the lubricated surface 12 of, for example, an energy transmission device such as a limited slip differential. By way of general explanation, as described with reference to FIG. 2, a limited slip differential may minimize a difference in angular velocity of output shafts (not shown) through operation of a clutch pack, shown generally at 14. The clutch pack 14 may be encased in a housing (not shown) and lubricated with a lubricant, such as, but not limited to, a gear oil such as Dexron® LS, commercially available from BP Lubricants USA, Inc. of Wayne, N.J. In particular, the clutch pack 14 may include a plurality of lubricated surfaces 12, e.g., separator plates, spaced apart from one another, and a plurality of friction members 10, e.g., friction plates, alternatingly disposed between and opposing the plurality of lubricated surfaces 12 so that the friction members 10 may interface and interact with the lubricated surfaces 12. That is, the friction members 10 may be arranged in alternating series with the lubricated surfaces 12 within the clutch pack 14.

During operation of the clutch pack 14, the friction members 10 operatively contact the lubricated surfaces 12. For example, the friction members 10 may frictionally connect to and disconnect from adjacent lubricated surfaces 12 in response to a difference in output shaft angular velocity so that mechanical and/or thermal energy may be transmitted between the friction member 10 and the corresponding opposing lubricated surface 12. That is, the friction member 10 may compress and rub against an opposing lubricated surface 12 so as to retard movement between the friction member 10 and the lubricated surface 12 via friction. Stated differently, the friction member 10 may frictionally engage and cooperate with the lubricated surface 12 intermittently as operating conditions warrant so that lubricant may be drawn in and squeezed out of the friction member 10. In other non-limiting examples, the friction member 10 may operatively contact a brake rotor of a disc brake system or a lubricated gear of a transmission. That is, the friction member 10 may be configured as a brake pad or a synchronizer ring.

Referring now to FIG. 1, the friction member 10 includes a substrate 16. The substrate 16 may be selected according to stiffness and/or strength properties required for a desired application of the friction member 10. For example, the substrate 16 may be suitable for providing strength and rigidity to the friction member 10, as set forth in more detail below, and may be formed from a deformation-resistant metal-based material such as steel. That is, the substrate 16 may be a metal plate such as, but not limited to, a steel backing plate.

With continued reference to FIG. 1, the friction member 10 also includes a friction material 18 including a resin and a fibrous base material impregnated with the resin, as set forth in more detail below. As used herein, the terminology "fibrous base material" refers to a base layer having a single ply for use in a partially-wet friction material 18. The fibrous base material may be a slurry composition before drying to form a wet, slurry-processed friction material 18. Also, the term "partially-wet friction material" refers to a relatively thin fibrous base layer impregnated by a resin or binder that is dried and bonded to a rigid or steel substrate 16 or backing plate. Further, partially-wet friction materials generally operate while at least partially submerged in a lubricant and have a thickness of from about 0.3 mm to about 1.5 mm. In contrast, dry friction materials generally operate under dry contact between the friction material and an opposing friction surface, and have a thickness of from about 3 mm to about 4.5 mm. Partially-wet friction materials may also be referred to as semi-wet or moist friction materials, and may be useful for applications requiring reduced or minimal lubrication. By comparison, wet friction materials generally operate while substantially submerged in a lubricant. Partially-wet friction materials may also be subjected to operating temperatures of about 100° C. greater than the operating temperatures of wet friction materials, and generally operate in an environment of relatively lower lubricant flow rate for cooling as compared to wet friction materials. As such, oil absorption capacity and temperature-resistance may be particularly important for partially-wet friction materials as compared to wet friction materials.

The fibrous base material of the friction material 18 (FIG. 1) includes a plurality of aramid fibers. As used herein, the terminology "aramid" refers to aromatic polyamide fibers. The aramid fibers may be produced by a reaction between an amine group and a carboxylic acid halide group. For example, the aramid fibers may be a synthetic polyamide chain in which at least 85 parts by volume of amide linkages, i.e., an acyl group (R—C=O) bonded to a nitrogen atom (N), based on 100 parts by volume of the synthetic polyamide chain are attached directly to two aromatic rings.

The plurality of aramid fibers may be further defined as a plurality of para-aramid fibers having an average length of less than or equal to about 5 mm. For example, the plurality of aramid fibers may be para-aramid fibers having a mean fiber length of about 1.4 mm and/or a bimodal mean fiber length of about 0.5 mm and about 1.4 mm. As used herein, the terminology "about" is a quantity modifier, and refers to +/−2% of the quantity being modified. The aramid fibers may be poly-(p-phenylene terephthalamdide) (PPTA) produced from the monomers p-phenylene diamine (PPD) and terephthaloyl dichloride (TDC) in a co-solvent with an ionic component such as calcium chloride to occupy hydrogen bonds of the amide groups, and an organic component N-methylpyrrolidone (NMP) to dissolve the aromatic polymer. The plurality of aramid fibers may have a density of about 1.44 g/cm³. Suitable aramid fibers are commercially available from Teijin Aramid GmbH of Arnhem, The Netherlands, under the trade name Twaron®.

In one variation, the plurality of aramid fibers includes a first component including a plurality of fibrillated aramid fibers and a second component including a plurality of non-fibrillated aramid fibers. As used herein, the terminology "fibrillated" refers to a fiber having a stalk and a plurality of fibrils extending from the stalk, wherein the stalk is generally columnar and the fibrils are comparatively thinner hair-like members attached to the stalk. That is, the stalk is substantially thicker than each of the plurality of fibrils.

The first component may include aramid fibers provided in a pulp form and having a high degree of fibrillation as compared to other fiber types, e.g., the aramid fibers of the second component. The aramid fibers of the first component may be short cut. That is, after the polymer production set forth above, the resulting aramid may be dissolved in water-free sulphuric acid and spun into filament yarn. The first component may be formed by shearing and chopping the filament yarn in water so that the aramid fibers are shortened and fibrillated. The plurality of fibrillated aramid fibers of the first component may have an average length of less than about 3 mm. A suitable first component is commercially available from Teijin Aramid GmbH of Arnhem, The Netherlands, under the trade name Twaron® 1094.

By comparison, the aramid fibers of the second component are non-fibrillated. That is, the second component has a minimal degree of fibrillation as compared to the first component. The non-fibrillated aramid fibers of the second component are generally free from the fibrils present in the first component. The aramid fibers of the second component may be present in dipped-chopped form and may have an average length of about 3 mm. Therefore, the second component may have a longer average length than the first component. A suitable second component is commercially available from Teijin Aramid GmbH of Arnhem, The Netherlands, under the trade name Twaron® 1588.

The first component and the second component may be present in the fibrous base material in a ratio of about 2:1. For example, the first component may be present in the fibrous base material in an amount of about 20 parts by weight based on 100 parts by weight of the fibrous base material, and the second component may be present in an amount of about 10 parts by weight based on 100 parts by weight of the fibrous base material. The first component and the second component may be present in the aforementioned ratio to provide a desired porosity of the fibrous base material. For example, the non-fibrillated second component may define surface pores in the fibrous base material having comparatively large sizes. Such pores may be difficult to clog and close, and as such, the second component may allow degradation products produced during operation of the friction member 10 to recede into the friction material 18. Such recession of degradation products into the friction material 18 may provide the friction material 18 with excellent glaze- and fade-resistance.

The second component may also induce clumping of the fibrous base material. Therefore, the first component may be present in the fibrous base material to counterbalance or compensate for the open pores defined by the second component. That is, the fibrillated first component may hold or contain other components of the fibrous base material better than the non-fibrillated second component, especially other components present in the fibrous base material in particle form. Together, the first component and the second component may therefore provide the desired porosity of the fibrous base material.

The plurality of aramid fibers is present in a first amount. Without intending to be limited by theory, the plurality of aramid fibers may be present in the fibrous base material to provide the fibrous base material with increased porosity, and to provide the friction member 10 with excellent strength, wear-resistance, and temperature-resistance. That is, as set forth above, the plurality of aramid fibers may support other comparatively smaller components of the fibrous base material, especially other components present in particle form. The plurality of aramid fibers may also provide connections between other fibrous components of the fibrous base material, as set forth in more detail below. The aramid fibers may be present in the first amount of from about 20 parts by weight to about 34 parts by weight, e.g., about 25 parts by weight to about 30 parts by weight, based on 100 parts by weight of the fibrous base material. When the aramid fibers are present in the fibrous base material in amounts less than about 20 parts by weight, the fibrous base material may have insufficient structure and strength, and may exhibit low pressure-resistance. However, at amounts of greater than about 34 parts by weight, the fibrous base material may be difficult to process and exhibit excess porosity.

The fibrous base material also includes a plurality of polyacrylonitrile-based carbon fibers. As used herein, the terminology "polyacrylonitrile-based" refers to carbon fibers produced from a polyacrylonitrile (PAN) precursor. The polyacrylonitrile-based carbon fibers may be produced by calcining preoxidized polyacrylonitrile fiber at a temperature of greater than or equal to about 1,000° C. in an inert gas to obtain fibers having a carbon content of at least 90 parts by weight, and a bond nitrogen content of from about 1 part by weight to about 8 parts by weight based on 100 parts by weight of the fiber.

In one variation, the plurality of polyacrylonitrile-based carbon fibers includes a third component having a third average length, and a fourth component having a fourth average length that is longer than the third average length. More specifically, the third component many be further defined as a plurality of milled polyacrylonitrile-based carbon fibers, and the third average length may be less than about 500 microns. In contrast, the fourth component may be further defined as a plurality of chopped polyacrylonitrile-based carbon fibers, and the fourth average length may be from about 2,500 microns to about 4,000 microns, e.g., about 3,000 microns. As used herein, the terminology "milled" refers to a carbon fiber which is shorter than a "chopped" carbon fiber. For example, the milled polyacrylonitrile-based carbon fibers may have the third average length of less than about 1,000 microns. By comparison, chopped polyacrylonitrile-based carbon fibers may have the fourth average length of from about 1,000 microns to about 25,000 microns. Strands of polyacrylonitrile-based carbon fiber may be milled into shorter-length polyacrylonitrile-based carbon fibers having the third average length of about 350 microns, for example. Further, the polyacrylonitrile-based carbon fibers may have an average fiber diameter of from about 7 microns to about 9 microns, and a density of from about 1.73 g/cm$^3$ to about 1.79 g/cm$^3$. Suitable polyacrylonitrile-based carbon fibers include AGM 94 polyacrylonitrile-based carbon fibers, commercially available from Asbury Graphite Mills, Inc. of Asbury, N.J. More specifically, suitable examples of milled and chopped polyacrylonitrile-based carbon fibers may be available under the identifiers AGM94MF350U and AGM94CF3, respectively.

The plurality of polyacrylonitrile-based carbon fibers is present in a second amount that is less than the first amount. That is, the fibrous base material includes comparatively more aramid fibers than polyacrylonitrile-based carbon fibers. Without intending to be limited by theory, the plurality of polyacrylonitrile-based carbon fibers may be present in the fibrous base material to provide the friction member 10 with excellent friction stability, i.e., a stable coefficient of friction, during operation, and increased strength, increased elastic recovery, and desired temperature- and noise-resistance. That is, the friction material 18 including the polyacrylonitrile-based carbon fibers may maintain a desired frictional engagement with the opposing lubricated surface 12 (FIG. 2) to thereby decrease shuddering of the energy transmission device during operation and decrease "fade", i.e., a reduction in the coefficient of friction ($\mu$) at high operating temperatures.

Further, the plurality of polyacrylonitrile-based carbon fibers may provide the friction material 18 with excellent temperature-resistance. In particular, the plurality of polyacrylonitrile-based carbon fibers exhibit desired thermal-conductivity and may cool any lubricant deposited in the pores of the friction material 18.

In addition, the plurality of polyacrylonitrile-based carbon fibers may provide the friction material 18 with excellent elastic recovery during frictional engagement of the friction member 10 with the opposing lubricated surface 12. In particular, the polyacrylonitrile-based carbon fibers have an increased elastic modulus, i.e., stiffness, and bounce-back characteristics when stressed in the elastic range as compared to other fibers.

The polyacrylonitrile-based carbon fibers may be present in the second amount of from about 5 parts by weight to about 15 parts by weight, e.g., about 10 parts by weight, based on 100 parts by weight of the fibrous base material. When the polyacrylonitrile-based carbon fibers are present in the fibrous base material in amounts less than about 5 parts by weight, the fibrous base material may have insufficient structure and strength, and the friction member 10 may exhibit low friction stability, temperature-resistance, and pressure-resistance. However, at amounts of greater than about 15 parts by weight, the fibrous base material may be difficult to process, and the friction member 10 may exhibit reduced pressure-resistance and temperature-resistance.

For variations including both the third component and the fourth component, the third component and the fourth component may be present in the fibrous base material in a ratio of about 1:1. For example, the third component may be present in the fibrous base material in an amount of about 5 parts by weight based on 100 parts by weight of the fibrous base material, and the fourth component may also be present in an amount of about 5 parts by weight based on 100 parts by weight of the fibrous base material. The fourth component may be present in the fibrous base material to provide the friction material 18 (FIG. 1) with increased pressure-resistance. That is, the fourth component may provide the friction material 18 with excellent porosity so that the lubricant may penetrate the friction material 18 during operation of the energy transmission device, yet the fourth material may also contribute to the excellent compression set and resistance to permanent deformation during operation of the friction material 18. That is, as described with reference to FIG. 2, the friction material 18 including the fourth component may be suitably compressible so that the lubricant may be squeezed into or out of the friction material 18 quickly under pressure applied by the opposing lubricated surface 12 of the energy transmission device. However, at amounts greater than about 10 parts by weight based on 100 parts by weight of the fibrous base material, the fibrous base material may be difficult to process because of entanglements caused by the comparatively-longer chopped polyacrylonitrile-based carbon fibers.

Generally, the third component may be present in the fibrous base material to counterbalance or compensate for open pores defined by the fourth component of the fibrous base material. That is, since the chopped polyacrylonitrile-based carbon fibers of the fourth component are longer than the milled polyacrylonitrile-based carbon fibers of the third component, the fourth component may not hold or contain other components of the fibrous base material as well as the third component, especially other components present in particle form. Therefore, the third component and the fourth component may be present together in the aforementioned ratio to provide a desired porosity and temperature-resistance of the friction material 18.

The fibrous base material also includes a plurality of carbon particles. As used herein, the terminology "carbon particles" is differentiated from the terminology "carbon fibers" and refers to carbon present in a non-fibrous form. For example, the plurality of carbon particles may be a form of carbon processed by physical reactivation and/or chemical reactivation and may have excellent porosity and high surface area, i.e. a Brunauer, Emmett, and Teller (BET) surface area of greater than or equal to about 250 $m^2/g$. The carbon particles may include, but are not limited to, carbon black, powdered activated carbon, granular activated carbon, extruded activated carbon, impregnated carbon, pyrolyzed carbon, and combinations thereof. That is, the carbon particles may be formed from carbon that has undergone pyrolysis.

The plurality of carbon particles may be further defined as primary particles, aggregates, or agglomerates. The primary particles may have a generally spherical shape, and may firmly link together to form aggregates, which may in turn join together to form agglomerates. Suitable carbon particles include carbon black, commercially available under the trade name Colour Black F101 from Evonik Degussa Corporation of Parsippany, N.J.

The plurality of carbon particles is present in a third amount that is less than or equal to the first amount. That is, the fibrous base material may include equal amounts of carbon particles and polyacrylonitrile-based carbon fibers, or comparatively less carbon particles than polyacrylonitrile-based carbon fibers. In particular, the plurality of carbon particles may be present in the third amount of from about 3 parts by weight to about 15 parts by weight, e.g., about 5 parts by weight to about 10 parts by weight, based on 100 parts by weight of the fibrous base material. Without intending to be limited by theory, the plurality of carbon particles may be present in the fibrous base material to provide the friction member 10 with excellent temperature- and noise-resistance during operation. In particular, the plurality of carbon particles exhibit desired thermal-conductivity and may cool any lubricant deposited in the pores of the friction material 18.

Further, the plurality of carbon particles may increase the dynamic coefficient of friction and reduce the static coefficient of friction of the friction member 10 and thereby contribute to the excellent noise-resistance of the friction member 10. The friction member 10 including the plurality of carbon particles present in the aforementioned third amount has an optimized slope of a μ-v curve. In particular, the slope of a μ-v curve represents a variation in coefficient of friction (μ) compared to a variation in sliding speed (v). For frictional applications, a positive slope is desired over a range of speeds to be controlled by the friction member 10 so as to decrease shudder, i.e., frictional vibration, within the energy transmission device. For example, the friction member 10 may decrease shuddering during braking or gear shifting. Therefore, the friction material 18 including the plurality of carbon particles may maintain a desired frictional engagement with the opposing lubricated surface 12 to thereby decrease shuddering of the energy transmission device during operation and decrease "fade", i.e., a reduction in the coefficient of friction (μ) at high operating temperatures. In addition, the plurality of carbon particles may provide the friction material 18 with a color, e.g., green, and therefore provide a distinguishable feature for marking and recognition of the friction member 10.

The fibrous base material also includes a plurality of mineral fibers. The mineral fibers may be formed from a vitreous melt, such as rock, slag, glass, or other mineral melts. The vitreous melt may be formed by blending selected rocks or minerals to provide a desired composition of the vitreous melt. The plurality of mineral fibers may be classified as engineering mineral fibers and may include a surface treatment such as, but not limited to, a silane or surfactant. As a non-limiting example, each of the plurality of mineral fibers may include, based on 100 parts by weight of the mineral fiber, $SiO_2$ in an amount of from about 38 parts by weight to about 43 parts by weight, $Al_2O_3$ in an amount of from about 18 parts by weight to about 23 parts by weight, CaO+MgO in an amount of from about 23 parts by weight to about 28 parts by weight, FeO in an amount of from about 4.5 parts by weight to about 8 parts by weight, $K_2O+Na_2O$ in an amount of about 4.5 parts by weight, and other ingredients in an amount of less than about 6 parts by weight.

Each of the plurality of mineral fibers may have a diameter of less than or equal to about 20 microns, e.g., less than about 10 microns, and a fifth average length that is greater than the third average length and less than the fourth average length. That is, the fifth average length may be from about 500 microns to less than about 2,500 microns. As a non-limiting example, the fifth average length may be from about 500 microns to about 800 microns, such as about 650 microns. Mineral fibers having the aforementioned fifth average length may contribute to the desired controlled porosity of the friction material 10. That is, the plurality of mineral fibers may balance the comparatively short milled polyacrylonitrile-based carbon fibers and the comparatively long aramid fibers within the fibrous base material to provide the excellent porosity of the fibrous base material.

Further, the plurality of mineral fibers may be comparatively harder than each of the plurality of polyacrylonitrile-based carbon fibers and the plurality of aramid fibers of the fibrous base material. For example, the plurality of mineral fibers may have a hardness of 6 on the Moh scale. Therefore, the plurality of mineral fibers may provide the friction member 10 with excellent wear- and pressure-resistance.

In addition, since the plurality of mineral fibers are comparatively long, hard, and temperature-resistant, the friction material 10 may have an increased surface roughness and exhibit an excellent glaze-resistance. That is, the combination of the strong and rigid substrate 16 and the excellent surface roughness of the friction material 10 may minimize excessive smoothening of the friction material 10 and provide the friction member 10 with excellent glaze-resistance.

The plurality of mineral fibers is present in the fibrous base material in a fourth amount that is less than or equal to the second amount. That is, the fibrous base material includes comparatively more polyacrylonitrile-based carbon fibers than mineral fibers. More specifically, the plurality of mineral fibers may be present in the fourth amount of from about 5 parts by weight to about 10 parts by weight, e.g., about 7 parts by weight, based on 100 parts by weight of the fibrous base material. A suitable example of mineral fibers is Rockbrake® RB280-Roxul® 1000, commercially available from Lapinus Fibers BV of Roermond, The Netherlands.

The fibrous base material also includes diatomaceous earth present in a fifth amount that is greater than the first amount. That is, the fibrous base material may include more diatomaceous earth than any other component of the fibrous base material, e.g., aramid fibers, polyacrylonitrile-based carbon fibers, carbon particles, or mineral fibers. In particular, the diatomaceous earth may be calcined diatomaceous earth having an average particle size of from about 10 microns to about 15 microns. As used herein, the terminology "calcined diatomaceous earth" refers to diatomaceous earth, i.e., sedimentary ore formed from freshwater planktonic species, that has been heat-treated, e.g., at temperatures at greater than about 800° C., to round off sharp corners of individual diatomaceous earth particles. Therefore, calcined diatomaceous earth may have reduced surface area but increased hardness as compared to natural, non-calcined diatomaceous earth. As such, the presence of the calcined diatomaceous earth in the fibrous base material generally provides the friction material 18 (FIG. 1) with excellent pressure-resistance.

The diatomaceous earth may have a pore size of from about 0.1 micron to about 1.0 micron, and may have a porosity of greater than 80 parts by volume based on 100 parts by volume of the diatomaceous earth. Further, the diatomaceous earth may have a mean particle size of from about 10 microns to 15 microns. Suitable diatomaceous earth includes Celite® 281, commercially available from World Minerals Inc. of Santa Barbara, Calif.

The diatomaceous earth may be present in the fifth amount of greater than or equal to about 35 parts by weight based on 100 parts by weight of the fibrous base material. That is, the fifth amount may be greater than either of the first amount, second amount, third amount, and fourth amount. For example, the diatomaceous earth may be present in the fifth amount of from about 40 parts by weight to about 50 parts by weight based on 100 parts by weight of the fibrous base material. In one non-limiting example, such as the variation of the fibrous base material including each of the first component, the second component, the third component, and the fourth component as set forth above, the diatomaceous earth may be present in the fifth amount of from about 40 parts by weight to about 47 parts by weight based on 100 parts by weight of the fibrous base material.

The diatomaceous earth may provide the friction member 10 with excellent noise-resistance and may complement the plurality of carbon particles. Further, diatomaceous earth may assist in resin absorption, as set forth in more detail below, and may promote lubricant flow through the friction material 18 (FIG. 1). That is, even when present in the fifth amount of greater than about 35 part by weight based on 100 parts by weight of the fibrous base material, the diatomaceous earth unexpectedly provides the fibrous base material with excellent noise-resistance without detrimentally affecting the structure and strength of the fibrous base material. In particular, when present in the fibrous base material in the fifth amount of greater than 35 parts by weight, the diatomaceous earth increases the dynamic coefficient of friction and reduces the static coefficient of friction of the friction member 10. Therefore, the friction member 10 including the diatomaceous earth present in the aforementioned fifth amount has an optimized slope of a μ-v curve. In particular, the slope of a μ-v curve represents a variation in coefficient of friction (μ) compared to a variation in sliding speed (v). For frictional applications, a positive slope is desired over a range of speeds to be controlled by the friction member 10 so as to decrease shudder, i.e., frictional vibration, within the energy transmission device. For example, the friction member 10 may decrease shuddering during braking or gear shifting.

Stated differently, the friction member 10 including the friction material 18 has increased noise-resistance. That is, the friction material 18 generates a desired torque curve having a shape defined by a positive μ-v slope so that the friction material 18 is substantially noise- or squawk-free during operation.

The fibrous base material may further include latex. Latex may be present in the fibrous base material as a saturant and processing aid, and may generally provide the fibrous base material with flexibility. Latex may also coat the aramid fibers, the polyacrylonitrile-based carbon fibers, and/or the mineral fibers to provide the fibrous base material with sufficient wet strength, i.e., web strength, for processability. The latex may be in the form of an aqueous dispersion, e.g., a medium acrylonitrile, acrylonitrile-butadiene copolymer formed by emulsion polymerization. That is, the latex may be a nitrile latex emulsion that is acrylonitrile-based. Further, the latex may have a Brookfield viscosity of about 15 cP at 25° C. The latex may be present in an amount of from about 1 part by weight to about 6 parts by weight, e.g., 3 parts by weight, based on 100 parts by weight of the fibrous base material. Suitable latex may include Hycar® 1562×117 latex, commercially available from Emerald Performance Materials LLC of Akron, Ohio.

To achieve the aforementioned temperature-resistance of the friction member 10, the fibrous base material may be substantially free from low-heat-resistant fibers and fillers such as cellulose, hemp, homoacrylic fibers, cashew nut shells, low-temperature cured rubber particles, and the like. Likewise, the fibrous base material is generally free from impregnation by epoxy- or oil-modified phenolic resins so as to maintain the excellent temperature-resistance of the resin and friction material 18.

In addition, to avoid swelling of the friction material 18 during operation of the friction member 10 upon contact with the lubricant, the fibrous base material may be substantially free from cellulose fibers which may react with any phosphorous and sulfur additives of the lubricant.

Therefore, as set forth above, the friction member 10 including the friction material 18 has increased wear-, noise-, pressure-, and temperature-resistance and is economical to produce. That is, the friction member 10 exhibits decreased degradation from abrasion and shear stress during operation of the energy transmission device, and performs suitably when partially wetted by a lubricant.

As set forth above, the fibrous base material is impregnated with the resin. The resin impregnates the fibrous base material to provide the friction material 18 with mechanical shear strength, temperature-resistance, and friction stability. The resin also counterbalances the presence of the diatomaceous earth in the friction material 18 and contributes to the enhanced friction stability of the friction material 18. Therefore, the resin may be a saturant and/or binder, and may have a viscosity of from about 2,500 cP to about 7,000 cP at 25° C. The resin may be any suitable resin selectable according to a desired application of the friction material 18. For example, the resin may be a thermoset resin. Further, the resin may be modified to increase the temperature-resistance of the resin by nitrile modification or dispersions of nano-particles.

In one non-limiting example, the resin may be a polyimide resin. In this example, the polyimide resin may be combined with a solvent, such as ethanol, for ease of processing. The polyimide resin may be hardened to increase strength and fracture toughness by combining the polyimide resin with a phenol resin. For example, the resin may include polyimide resin and phenol resin in a ratio of about 9:1, i.e., 90 parts by weight of the polyimide resin to about 10 part by weight of the phenol resin based on 100 parts by weight of the resin. Combining the polyimide resin and the phenol resin may provide the friction material 18 with an increased hardness and coefficient of friction, which in turn may provide the friction member 10 with excellent wear- and noise-resistance. The polyimide resin may also be combined with other resins. In other variations, the resin may be selected from phenolic resins, silicone resins, mixtures of resins, multiple resin systems, and combinations thereof. Generally, epoxy- or oil-modified phenolic resins are avoided so as to maintain the excellent temperature-resistance of the resin and friction material 18.

The fibrous base material may be impregnated with the resin at a resin pick-up of from about 20 parts by weight to about 100 parts by weight, e.g., about 40 parts by weight to about 75 parts by weight, based on 100 parts by weight of the fibrous base material. That is, the percent of resin pick-up by the fibrous base material, i.e., a weight percent of the resin based on the weight of the dry fibrous base material, may range from about 20% to about 100%. At resin amounts below about 20 parts by weight, the fibrous base material may not exhibit sufficient strength, and at resin amounts greater than about 100 parts by weight, the fibrous base material may be oversaturated so that the friction material 18 exhibits poor porosity and lubricant absorption, resulting in glazing and noise, vibration, and harshness (NVH) sensitivity. Further, the aforementioned resin pick-up contributes to the excellent noise-resistance and pressure-resistance of the friction material 18 by coating the fibrous base material. A suitable resin may include SKYBOND® 700, commercially available from Industrial Summit Technology Corporation of Parlin, N.J.

The friction material 18 may be formed via any processing system capable of mixing the plurality of aramid fibers, the plurality of polyacrylonitrile-based carbon fibers, the plurality of carbon particles, the plurality of mineral fibers, and diatomaceous earth. For example, the friction material 18 may be formed via drylaid, airlaid, coform, or wetlaid fiber processes and coated, saturated, and slurry-impregnated resin addition processes. Further, the friction material 18 may be produced on paper machines and resin saturation equipment recognizable to one skilled in the art.

By way of a non-limiting example, a process for forming the friction material 18 may include combining the plurality of aramid fibers, plurality of polyacrylonitrile-based carbon fibers, plurality of carbon particles, plurality of mineral fibers, diatomaceous earth, and optional latex with water to form a slurry. The slurry may be pumped to a forming wire of a paper machine. Generally, the forming wire may define a plurality of openings configured for draining the water in the slurry. During processing, water in the slurry drains through the openings, and the remaining wet paper is carried to a drying section of the paper machine so that any remaining water may be removed by drying to thereby form dried paper, i.e., the fibrous base material.

The fibrous base material may then be impregnated and saturated by the resin by, for example, immersion, surface coating, or spray saturating. The impregnated fibrous base material, i.e., the friction material 18, is dried to a "B" stage semi-cured state, rolled onto a reel, and sheeted to desired dimensions. The formed friction material 18 may have a basis weight of from about 60 lbs/3,000 ft$^2$ to about 400 lbs/3,000 ft$^2$. That is, the friction material 18 may have a basis weight of from about 150 lbs/3,000 ft$^2$ to about 250 lbs/3,000 ft$^2$, e.g., about 200 lbs/3,000 ft$^2$. The friction material 18 may have a thickness of from about 12 mils to about 60 mils, e.g., from about 25 mils to about 35 mils, where 1 mil is equal to 0.0254 mm. Further, the friction material 18 may have a density of from about 4.5 lbs/3,000 ft$^2$/0.001 in to about 8.0 lbs/3,000 ft$^2$/0.001 in, e.g., from about 5.9 lbs/3,000 ft$^2$/0.001 in to about 6.6 lbs/3,000 ft$^2$/0.001 in.

The friction material 18 has a single ply. As used herein, the terminology "ply" refers to a single layer of the friction material 18. That is, the friction material 18 is not multi-layered and does not include two or more plies. Rather, the friction material 18 may be in the form of a sheet having a single ply. Therefore, the friction material 18 advantageously exhibits reduced delamination from the substrate 16 during operation, and thus contributes to the excellent wear-resistance of the friction member 10.

Referring again to FIG. 1, for the friction member 10, the friction material 18 defines a first surface 20 bonded to the substrate 16 and a second surface 22 configured for operatively contacting the lubricated surface 12 (FIG. 2). The first surface 20 of the friction material 18 may be bonded to the substrate 16 by way of, for example, a phenolic adhesive sheet and/or subjecting the impregnated friction material 18 to pressure and/or temperature to bond the friction material 18 to the substrate 16 by way of the resin. Further, the resin may be cured before and after bonding the friction material 18 to the substrate 16. The aforementioned thickness and density of the friction material 18 may be achieved by applying a pressure to the friction material 18 that is greater than or equal to the operating pressure of the friction member 10, e.g., about 20 MPa. Such operating pressure may stress and/or fracture the plurality of polyacrylonitrile-based carbon fibers in the fibrous base material and thereby minimize further fragmentation of the plurality of polyacrylonitrile-based carbon fibers and compression set of the friction material 18 during operation.

Therefore, with continued reference to FIGS. 1 and 2, during operation, the second surface 22 may operatively contact, e.g., frictionally connect to and disconnect from adjacent lubricated surfaces 12 so as to compress and rub against an opposing lubricated surface 12. That is, the friction member 10 may frictionally engage and cooperate with the lubricated surface 12 intermittently as operating conditions warrant so that lubricant may be drawn in and squeezed out of the friction member 10.

As such, the friction material 18 may be penetrable by the aforementioned lubricant during operation. However, the friction material 18 may be compatible with any suitable lubricant, including oils and transmission fluids formulated with additives to minimize thermal breakdown of the lubricant.

Further, as shown in FIG. 1, the friction material 18 may be bonded to multiple surfaces of the substrate 16. That is, by way of non-limiting examples, the friction material 18 may be bonded to opposing surfaces or sides of the substrate 16 for operatively contacting two adjacent lubricated surfaces 12. For example, although not shown in FIG. 2, the friction material 18 may be disposed on and bonded to two surfaces of the substrate 16, e.g., a "front" and "back" of the substrate 16, so as to be sandwiched between and operatively contact two adjacent lubricated surfaces 12. Alternatively, the friction material 18 may only be bonded to a single surface of the substrate 16.

Moreover, for applications including the clutch pack 14 of FIG. 2, it is to be appreciated that the plurality of friction members 10 may be arranged in any configuration within the clutch pack 14. In addition, each of the plurality of friction members 10, e.g., friction plates, and the plurality of lubricated surfaces 12, e.g., separator plates, may include the friction material 18 bonded to the substrate 16. That is, although not shown in FIG. 2, the plurality of lubricated surfaces 12 may also include the friction material 18.

The friction material 18 may have any suitable size and/or shape. For example, the friction material 18 may have an annular or full ring shape as shown in FIG. 2. Alternatively, although not shown, the friction material 18 may be segmented into shapes including, but not limited to, arcs, strips, wedges, and combinations thereof. The friction material 18 may also define a plurality of molded and/or cut grooves, i.e., channels, therein (not shown) so as to optimize lubricant flow during operation.

The following examples are meant to illustrate the disclosure and are not to be viewed in any way as limiting to the scope of the disclosure.

EXAMPLES

To form the friction materials of each of Examples 1 and 2, components A-H are combined with water in the amounts listed in Table 1 to form a slurry. The amounts of Components A-H listed in Table 1 refer to parts by weight based on 100 parts by weight of the fibrous base material. The slurry is pumped to a forming wire of a paper machine, and water in the slurry drains through openings defined by the forming wire to form a wet paper. The wet paper is carried to a drying section of the paper machine and water is further removed by drying to thereby form dried paper, i.e., a fibrous base material of each of Examples 1 and 2. Each fibrous base material is then saturated with Resin J at the resin pick-up listed in Table 1 to form a friction material of each of Examples 1 and 2.

TABLE 1

Friction Material Compositions

|  | Ex. 1 | Ex. 2 |
|---|---|---|
| Component A | 20 | 20 |
| Component B | 10 | 10 |
| Component C | 10 | 5 |
| Component D | — | 5 |
| Component E | 10 | 5 |
| Component F | 40 | 45 |
| Component G | 7 | 7 |
| Component H | 3 | 3 |
| Total | 100 | 100 |
| Resin J | 67 | 67 |

Component A is Twaron™ 1094 fibrillated aramid fibers commercially available from Teijin Aramid GmbH of Arnhem, The Netherlands;

Component B is Twaron® 1588 non-fibrillated aramid fibers commercially available from Teijin Aramid GmbH of Arnhem, The Netherlands;

Component C is AGM 94 milled polyacrylonitrile-based carbon fibers having a third average length of 350 microns and commercially available under the identifier AGM94MF350U from Asbury Graphite Mills, Inc. of Asbury, N.J.;

Component D is AGM 94 chopped polyacrylonitrile-based carbon fibers having a fourth average length of 3 mm and commercially available under the identifier AGMCF3 from Asbury Graphite Mills, Inc. of Asbury, N.J.;

Component E is Colour Black F101 carbon particles commercially available from Evonik Degussa Corporation of Parsippany, N.J.;

Component F is Celite® 281 calcined diatomaceous earth commercially available from World Minerals Inc. of Santa Barbara, Calif.;

Component G is Rockbrake® RB280-Roxul® 1000 mineral fibers commercially available from Lapinus Fibers BV of Roermond, The Netherlands;

Component H is Hycar® 1562×117 latex commercially available from Emerald Performance Materials LLC of Akron, Ohio; and Resin J is SKYBOND® 700 polyimide resin commercially available from Industrial Summit Technology Corporation of Parlin, N.J.

The friction materials of Examples 1 and 2 are compared to friction materials of Comparative Examples 3 and 4 for friction performance, and the results are summarized in Tables 2 and 3. The friction material of Comparative Example 3 is a carbon fiber-reinforced plastic friction material. The friction material of Comparative Example 3 includes a fibrous base material including woven carbon fiber embedded in a synthetic matrix. In addition, the friction material of Comparative Example 3 includes thermosetting plastics as a binding component and does not include mineral fibers.

The friction material of Comparative Example 4 is a carbon fiber-reinforced carbon friction material. The friction material of Comparative Example 4 includes a fibrous base material including woven carbon fiber and pyrolytic carbon produced by chemical vapor deposition of hydrocarbon gas. The friction material of Comparative Example 4 also does not include mineral fibers.

The resulting friction material of each of Examples 1 and 2 and Comparative Examples 3 and 4 has a thickness of 32 mils. Each friction material is bonded to respective steel backing plate substrates under a pressure of about 20 MPa at 232° C. for 1 minute to form the friction members of Examples 1 and 2 and Comparative Examples 3 and 4.

Falex Durability Test

The friction members of Examples 1 and 2 and Comparative Examples 3 and 4 are evaluated for wear-resistance and pressure-resistance on a Falex Multi-Specimen Test Machine. Each friction member is rotated under load in Gear Oil K at 118° C. against a stationary steel countersurface for fixed time periods. Gear Oil K is Dexron® LS 75W-90 gear oil commercially available from General Motors Incorporated of Detroit, Mich. Wear rate, coefficient of friction, and a product of pressure (P, MPa) on the contact area and surface velocity (V, m/s) are measured as each friction member progresses through a matrix of pressures and surface velocities. In particular, each friction member is stepped through the matrix of pressures and surface velocities where speed is constant at 10.9 m/s, pressure is increased from 0.54 MPa to 3.06 MPa in 14 steps at loads from 140 $lb_f$ to 790 $lb_f$ under continuous sliding for 10 minutes at each load step. The PV, i.e., pressure-velocity, range is from 5.9 MPa m/s to 33.2 MPa m/s. A friction member that survives without degradation and/or failure beyond 24 MPa m/s, i.e., beyond 90 minutes, passes the aforementioned test. That is, a friction member that does not exhibit excessive wear and/or destruction beyond 24 MPa m/s is deemed acceptable. The test results are listed in Table 2.

TABLE 2

Falex Durability Test Results

|  | Ex. 1 | Ex. 2 | Comp. Ex. 3 | Comp. Ex. 4 |
|---|---|---|---|---|
| PV > 24 MPa m/s | Yes | Yes | No | No |
| Thickness loss (%, $(t_i - t_f)/t_i$) | 1.7 | 1.7 | >10 | >10 |
| Debonding of friction material from substrate | No | No | Yes | Yes |

As shown by the results listed in Table 2, each of the friction members of Examples 1 and 2, which includes greater than 45 parts by weight diatomaceous earth based on 100 parts by weight of the friction material, and aramid fibers, polyacrylonitrile-based carbon fibers, carbon particles, and mineral fibers, does not exhibit wear beyond 24 MPa m/s and therefore passes the aforementioned test. In contrast, each of the friction members of Comparative Examples 3 and 4, which includes less than 45 parts by weight diatomaceous earth based on 100 parts by weight of the friction material, and does not include mineral fibers, exhibits wear beyond 24 MPa m/s and therefore does not pass the Falex Durability test. In addition, thickness loss over the 140 minute test duration is acceptable for the friction members of Examples 1 and 2 and unacceptable for the friction members of Comparative Examples 3 and 4. Further, destruction and/or debonding of the friction material from the substrate occurs for the friction members of Comparative Examples 3 and 4, and does not occur for the friction members of Examples 1 and 2.

Therefore, the friction members of Examples 1 and 2 exhibit higher wear-resistance and pressure-resistance than the friction members of Comparative Examples 3 and 4.

μ P v T Testing

The friction materials of Examples 1 and 2 and Comparative Examples 3 and 4 are evaluated for noise-resistance on an SAE No. 2 Universal Wet Friction Test Machine according to the SAE J2490 test method for 24 hours. For the test method, the lubricant is gear oil, and the reaction plates, i.e., lubricated surfaces, are steel clutch plates. A μ-v curve is generated for each friction material and the slope of each μ-v curve is noted as positive or negative, as summarized in Table 3. A friction material that has a positive μ-v slope curve passes the aforementioned μ P v T test. That is, higher coefficients of friction and descending μ-v curve shapes are desirable and correlated to higher noise-resistance, i.e., quieter operation, of the friction material.

TABLE 3

Noise-Resistance and Thermal-Resistance of Friction Materials

|  | Ex. 1 | Ex. 2 | Comp. Ex. 3 | Comp. Ex. 4 |
|---|---|---|---|---|
| μ-v curve slope | Positive | Positive | Negative | Negative |
| Noise-resistance | Acceptable | Acceptable | Not Acceptable | Not Acceptable |

As shown by the results listed in Table 3, each of the μ-v curves of the friction materials of Examples 1 and 2 has a positive slope. Therefore, each of the friction materials of Examples 1 and 2, which includes greater than 45 parts by weight diatomaceous earth based on 100 parts by weight of the friction material, and aramid fibers, polyacrylonitrile-based carbon fibers, carbon particles, and mineral fibers, passes the aforementioned test. That is, the friction materials of Examples 1 and 2 have higher coefficients of friction and descending μ-v curve slopes as compared to the friction materials of Comparative Examples 3 and 4. In contrast, each of the μ-v curves of the friction materials of Comparative Examples 3 and 4 has a negative slope. Therefore, the friction materials of Comparative Examples 3 and 4, which do not include any diatomaceous earth or mineral fibers, do not pass the aforementioned test. Therefore, the friction materials of Examples 1 and 2 exhibit increased noise-resistance as compared to the friction materials of Comparative Examples 3 and 4, and have an increasing coefficient of friction as slip speed increases.

While the best modes for carrying out the disclosure have been described in detail, those familiar with the art to which this disclosure relates will recognize various alternative designs and embodiments for practicing the disclosure within the scope of the appended claims.

The invention claimed is:

1. A friction material comprising:
   a resin; and
   a fibrous base material impregnated with the resin and having a single ply, the fibrous base material including;
      a plurality of aramid fibers present in a first amount and including;
         a first component including a plurality of fibrillated aramid fibers; and
         a second component including a plurality of non-fibrillated aramid fibers;
         wherein the first component and the second component are present in the fibrous base material in a ratio of about 2:1;
      a plurality of polyacrylonitrile-based carbon fibers present in a second amount that is less than the first amount and including;
         a third component having a third average length, wherein the third component is further defined as a plurality of milled polyacrylonitrile-based carbon fibers and the third average length is less than about 500 microns; and
         a fourth component having a fourth average length that is longer than the third average length;
         wherein the third component and the fourth component are present in the fibrous base material in a ratio of about 1:1;
      a plurality of carbon particles present in a third amount that is less than or equal to the second amount;
      a plurality of mineral fibers present in a fourth amount that is less than or equal to the second amount; and
      diatomaceous earth present in a fifth amount that is greater than the first amount, wherein the fifth amount is from about 40 parts by weight to about 47 parts by weight based on 100 parts by weight of the fibrous base material.

2. The friction material of claim 1, wherein the fourth component is further defined as a plurality of chopped polyacrylonitrile-based carbon fibers and the fourth average length is from about 2,500 microns to about 4,000 microns.

3. The friction material of claim 2, wherein the second amount is from about 5 parts by weight to about 15 parts by weight based on 100 parts by weight of the fibrous base material.

4. The friction material of claim 1, wherein the plurality of mineral fibers has a fifth average length that is greater than the third average length and less than the fourth average length.

5. The friction material of claim 1, wherein the diatomaceous earth is calcined diatomaceous earth having an average particle size of from about 10 microns to about 15 microns.

6. The friction material of claim 5, wherein the first amount is from about 20 parts by weight to about 34 parts by weight based on 100 parts by weight of the fibrous base material.

7. The friction material of claim 1, wherein the first amount is from about 20 parts by weight to about 34 parts by weight based on 100 parts by weight of the fibrous base material.

8. The friction material of claim 7, wherein the second amount is from about 5 parts by weight to about 15 parts by weight based on 100 parts by weight of the fibrous base material.

9. The friction material of claim 7, wherein the third amount is from about 3 parts by weight to about 15 parts by weight based on 100 parts by weight of the fibrous base material.

10. The friction material of claim 7, wherein the fourth amount is from about 5 parts by weight to about 10 parts by weight based on 100 parts by weight of the fibrous base material.

11. The friction material of claim 1, wherein the second amount is from about 5 parts by weight to about 15 parts by weight based on 100 parts by weight of the fibrous base material.

12. The friction material of claim 11, wherein the third amount is from about 3 parts by weight to about 15 parts by weight based on 100 parts by weight of the fibrous base material.

13. The friction material of claim 1, wherein the third amount is from about 3 parts by weight to about 15 parts by weight based on 100 parts by weight of the fibrous base material.

14. The friction material of claim 1, wherein the fourth amount is from about 5 parts by weight to about 10 parts by weight based on 100 parts by weight of the fibrous base material.

15. The friction material of claim 1, wherein the fibrous base material is impregnated with the resin at a resin pick-up of from about 20 parts by weight to about 100 parts by weight based on 100 parts by weight of the fibrous base material.

16. A friction member for operatively contacting a lubricated surface, the friction member comprising:
a substrate; and
a friction material defining a first surface bonded to the substrate and a second surface configured for operatively contacting the lubricated surface, the friction material including;
a resin; and
a fibrous base material impregnated with the resin and having a single ply, the fibrous base material including;
a plurality of aramid fibers present in a first amount and including;
a first component including a plurality of fibrillated aramid fibers; and
a second component including a plurality of non-fibrillated aramid fibers;
wherein the first component and the second component are present in the fibrous base material in a ratio of about 2:1;
a plurality of polyacrylonitrile-based carbon fibers present in a second amount that is less than the first amount and including;
a third component having a third average length, wherein the third component is further defined as a plurality of milled polyacrylonitrile-based carbon fibers and the third average length is less than about 500 microns; and
a fourth component having a fourth average length that is longer than the third average length;
wherein the third component and the fourth component are present in the fibrous base material in a ratio of about 1:1;
a plurality of carbon particles present in a third amount that is less than or equal to the second amount;
a plurality of mineral fibers present in a fourth amount that is less than or equal to the second amount; and
diatomaceous earth present in a fifth amount that is greater than the first amount, wherein the fifth amount is from about 40 parts by weight to about 47 parts by weight based on 100 parts by weight of the fibrous base material.

17. The friction member of claim 16, wherein the fourth component is further defined as a plurality of chopped polyacrylonitrile-based carbon fibers and the fourth average length is from about 2,500 microns to about 4,000 microns.

18. The friction member of claim 17, wherein the plurality of mineral fibers has a fifth average length that is greater than the third average length and less than the fourth average length.

19. The friction member of claim 16, wherein the fibrous base material is impregnated with the resin at a resin pick-up of from about 20 parts by weight to about 100 parts by weight based on 100 parts by weight of the fibrous base material.

20. A friction material comprising:
a resin; and
a fibrous base material impregnated with the resin and having a single ply, the fibrous base material including;
a plurality of aramid fibers present in a first amount of from about 20 parts by weight to about 34 parts by weight based on 100 parts by weight of the fibrous based material and including;
a first component including a plurality of fibrillated aramid fibers; and
a second component including a plurality of non-fibrillated aramid fibers;
wherein the first component and the second component are present in the fibrous base material in a ratio of about 2:1;
a plurality of polyacrylonitrile-based carbon fibers present in a second amount that is less than the first amount and including;
a third component having a third average length, wherein the third component is further defined as a plurality of milled polyacrylonitrile-based carbon fibers and the third average length is less than about 500 microns; and
a fourth component having a fourth average length that is longer than the third average length, wherein the fourth component is further defined as a plurality of chopped polyacrylonitrile-based carbon fibers and the fourth average length is from about 2,500 microns to about 4,000 microns;
wherein the third component and the fourth component are present in the fibrous base material in a ratio of about 1:1;
wherein the second amount is from about 5 parts by weight to about 15 parts by weight based on 100 parts by weight of the fibrous base material;
a plurality of carbon particles present in a third amount that is less than or equal to the second amount, wherein the third amount is from about 3 parts by weight to about 15 parts by weight based on 100 parts by weight of the fibrous base material;
a plurality of mineral fibers present in a fourth amount that is less than or equal to the second amount, wherein the fourth amount is from about 5 parts by weight to about 10 parts by weight based on 100 parts by weight of the fibrous base material; and
calcined diatomaceous earth having an average particle size of from about 10 microns to about 15 microns and present in a fifth amount that is greater than the first amount, wherein the fifth amount is from about 40 parts by weight to about 47 parts by weight based on 100 parts by weight of the fibrous base material;
wherein the fibrous base material is impregnated with the resin at a resin pick-up of from about 20 parts by weight to about 100 parts by weight based on 100 parts by weight of the fibrous base material.

\* \* \* \* \*